Figure 1:
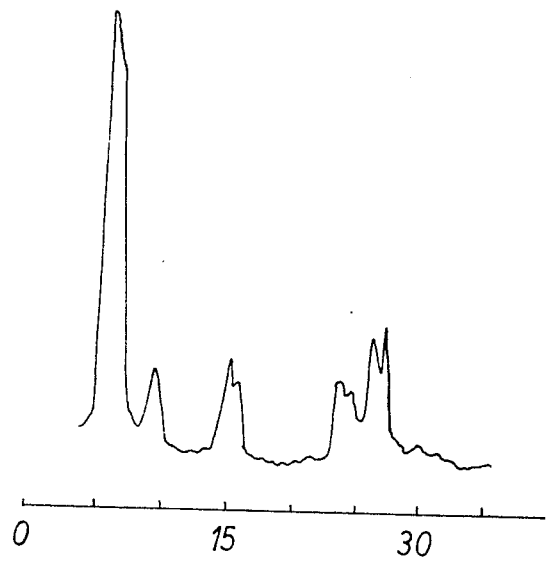

United States Patent [19]

Cabut et al.

[11] 4,141,904
[45] Feb. 27, 1979

[54] PROCESS FOR THE PREPARATION OF PHTHALOCYANINE PIGMENTS

[75] Inventors: Louis A. Cabut, Creil; Jean-Claude H. R. Hardouin, Chantilly; Michel E. A. Huille, Creil; Daniel Pigasse, Chantilly, all of France

[73] Assignee: Produits Chimiques Ugine Kuhlmann, Courbevoie, France

[21] Appl. No.: 776,012

[22] Filed: Mar. 9, 1977

Related U.S. Application Data

[63] Continuation-in-part of Ser. No. 561,389, Mar. 24, 1975, abandoned.

[30] Foreign Application Priority Data

Mar. 24, 1975 [FR] France ................................ 74 10056

[51] Int. Cl.$^2$ ............................................. C09B 47/04
[52] U.S. Cl. ............................ 260/314.5; 106/288 Q; 106/309
[58] Field of Search ............................ 106/288 Q, 309; 260/314.5

[56] References Cited

U.S. PATENT DOCUMENTS

| | | | |
|---|---|---|---|
| 3,065,092 | 11/1962 | Geiger et al. | 106/288 Q |
| 3,351,481 | 11/1967 | Hopmeier et al. | 106/309 |
| 3,589,924 | 6/1971 | Giambaluo | 106/288 Q |
| 3,647,496 | 3/1972 | Bagai | 106/309 |
| 3,754,955 | 8/1973 | Kienzle et al. | 106/288 Q |
| 3,758,320 | 9/1973 | Flores | 106/309 |
| 3,764,361 | 10/1973 | Kienzle et al. | 106/288 Q |
| 3,767,442 | 10/1973 | Kienzle et al. | 106/288 Q |
| 3,770,476 | 11/1973 | McKay | 106/288 Q |

*Primary Examiner*—R. Dean
*Assistant Examiner*—John P. Sheehan
*Attorney, Agent, or Firm*—Beveridge, DeGrandi, Kline & Lunsford

[57] ABSTRACT

Improved process for the preparation of copper phthalocyanine pigment stable to crystallization by grinding a crude copperphthalocyanine and adding a compound stabilizing the pigment against crystallization and derived from phthalocyanine, wherein the improvement comprises dry grinding the crude phthalocyanine in the absence of any mineral substrate and of any crystallizing solvent thereby obtaining a ground phthalocyanine of non-pigmentary or feebly pigmentary character, and treating the said ground phthalocyanine with a crystallizing solvent in the presence of the stabilizing compound at a temperature from ordinary room temperature to the boiling temperature of the solvent, the concentration of the stabilizing compound being from 1% to 25% of the weight of the phthalocyanine; pigmentary compositions in the form of powder or pigmented paste obtained by such a process and compositions containing a stable copper phthalocyanine pigment prepared in accordance with such a process.

14 Claims, 7 Drawing Figures

PROCESS FOR THE PREPARATION OF PHTHALOCYANINE PIGMENTS

This is a continuation-in-part of application Ser. No. 561,389 filed Mar. 24, 1975 now abandoned.

The invention relates to a process for the preparation of phthalocyanine pigments stable to crystallization, to pigments obtained by this process and to the use of the pigments.

It is known that dry grinding is frequently used in the conditioning of phthalocyanines. Grinding may be effected in the presence of a mineral substrate used as grinding agent, followed by elimination of this substrate. As used herein the term "mineral substrate" is intended to mean a water-soluble salt most often an alkali metal salt of an acid especially of an inorganic, mineral acid. Examples include, but are not limited to sodium chloride and sodium sulphate. Also contemplated are ammonium sulphate, calcium chloride and aluminum salts of an inorganic acid; e.g. aluminum sulfate. The salts are commonly used at the rate of several parts of substrate to one part of phthalocyanine to be ground.

It is also known that phthalocyanines in pigmentary form, when they are in an organic solvent medium, may in time undergo considerable modifications in their coloring power and in their shade, as well as the phenomenon of flocculation.

Various means have been proposed in order to prevent this very troublesome development in practice.

With this object phthalocyanines synthesized from phthalodinitrile according to U.S. Pat. No. 3,051,721 and French Pat. No. 1,271,406 have been tried.

With the same object slighty halogenated phthalocyanines have also been synthesized according to U.S. Pat. No. 3,024,247; German Patent Application Nos. 1,200,981 filed on Apr. 27, 1961 and 1,419,915 filed on Oct. 31, 1961 and French Pat. No. 1,218,935.

These measures have the disadvantage of not providing a solution for the stabilization of phthalocyanines synthesized by processes other than those proposed, and further, they do not always show a satisfactory efficiency.

For the same purpose of incorporating stabilising compounds derived from phthalocyanine, in the phthalocyanine to be stabilised, there have been used compounds such as the compounds disclosed in U.S. Pat. Nos. 3,764,361, 3,754,955 and 3,767,442 (which U.S. Patents are incorporated herewith by reference and relied upon), French Pat. Nos. 1,412,828 and 1,332,175, Japanese Patent Application No. 69/17026 filed on Oct. 23, 1964, and German Patent Application No. 1,187,219 filed on Feb. 16, 1961.

These techniques, especially those of U.S. Pat. Nos. 3,764,361, 3,754,955 and 3,767,442, result in an appreciable improvement of the stability in solvents, the copper phthalocyanines treated according to these last patents no longer giving rise to any modification of their crystallographic form nor their shade, nor to perceptible increases in the measurement of their crystals. On the other hand, their crystallinity, their colouring power, the viscosity of the pigmentary preparations based on organic solvents made by means of these pigments continue to undergo appreciable variations with time in spite of these treatments.

By means of the present invention it is possible to obtain phthalocyanine pigments both in paste form in a solvent medium and in powder form which not only keep their crystallographic form, their shade and the dimensions of their crystals with time, but also show the important advance with respect to the state of the art, in practice, retaining over the course of time their crystallinity, their colour yield and the viscosity of the pigmentary preparations based on organic solvents made using these pigments. In particular, the very good constancy of the crystallinity as a function of time and in a solvent medium is a characteristic result which may be obtained by means of the invention.

According to the invention an improved process for the preparation of copper phthalocyanine pigment stable to crystallisation by grinding a crude copper phthalocyanine and adding a compound stabilising the pigment against crystallisation and derived from phthalocyanine is provided wherein the improvement comprises dry grinding the crude phthalocyanine in the absence of any mineral substrate and of any crystallising solvent thereby obtaining a ground phthalocyanine of non-pigmentary or feebly pigmentary character, and treating the said ground phthalocyanine with a crystallising solvent in the presence of the stabilising compound at a temperature from ordinary room temperature to the boiling temperature of the solvent, the concentration of the stabilising compound being from 1% to 25% of the weight of the phthalocyanine.

The grinding of the crude phthalocyanine in the absence of any mineral substrate necessarily and inherently leads to the obtaining of a ground phthalocyanine of non-pigmentary or feebly pigmentary character as is well known to those skilled in the art.

Figure 2:
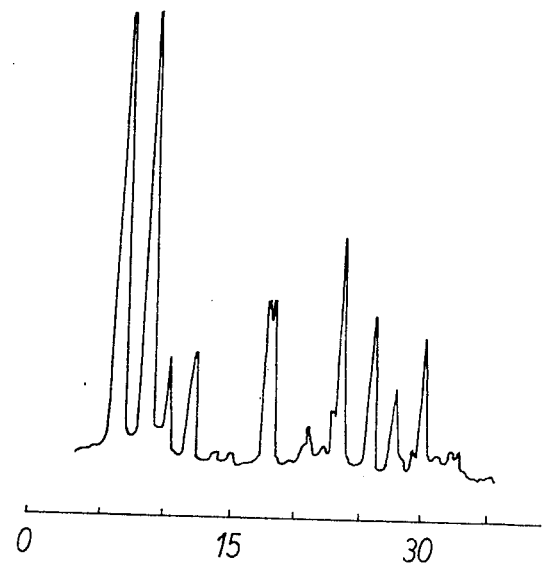

By "crystallising solvent" we mean any solvent capable of causing profound modifications in the pigmentary copper phthalocyanine in its α form, free from phthalocyanine prepared from phthalodinitrile, free from chlorine and free from stabilising compound, when this solvent at boiling temperature is recovered and impregnates the pigment for 2 hours. These profound modifications comprise in particular a transformation of the greater part or the whole of the pigment into a pigment of β form, and a considerable increase in the crystallinity, and are illustrated in FIGS. 1 and 2 of the accompanying drawings. These Figures show respectively the X-ray powder diagram of the copper phthalocyanine in α form before and after immersion in xylene. Xylene has been chosen as an example representative of a crystallising solvent. These Figures have as abscissae the angle "2 θ" and and as ordinates the relative intensity of the diffracted X-rays.

In FIG. 1, the position of the peaks is characteristic of the α form, and the moderate height of the peaks shows a relatively weak crystallinity.

FIG. 2 shows a very different aspect, the position of the peaks y is in fact characteristic of the β form and their height is much greater, and their sharpness and their resolution (their separation) prove a distinctly more marked state of crystallinity.

When the question is raised of how to know if a solvent is or is not a crystallising solvent according to the invention, the definition and the criterion given above enable it to be easily answered.

Examples of crystallising solvents are benzene, toluene, xylene, chlorobenzene, nitrobenzene, aniline, pyridine, dimethylformamide, dimethylsulphoxide, N-methylpyrrolidone, hexamethylphosphorotriamide, morpholine, trichloroethylene, butyl acetate, a mixture of any of these solvents, an aqueous solution or aqueous emulsion of these solvents, or a mixture of one or more of these solvents with non-crystallising solvents.

The aqueous solutions or emulsions generally contain at least 40% and preferably at least 60% of solvent (composition variable according to the solvent).

Examples of non-crystallising solvents are ethanol, acetone, aliphatic hydrocarbons and water.

When the treatment according to the process of the invention is finished the crystallising solvent can be removed partly or completely from the suspension obtained at the end of the treatment by any suitable means. Thus, one may obtain a paste of the pigment in a solvent medium, on separating most of the solvent, for example, by filtration. It is possible to use this paste as such. The solvent (having served for the treatment) may also be displaced by another solvent suitable for another use, or the pigment may also be dried.

The concentration of ground phthalocyanine may be from 5% to 50% and more particularly from 10% to 40% of the weight of the crystallising solvent.

In accordance with the invention, the crude phthalocyanine may be copper phthalocyanine in one of the crystallographic forms α, β, γ or ε (the form ε is sometimes also named form δ, X or R), or a mixture of these forms.

The crude phthalocyanine subjected to the treatment of the invention may be for example a slightly halogenated phthalocyanine or a phthalocyanine synthesised from phthalodinitrile. However, the invention advantageously applies to phthalocyanines prepared by other methods, for example, from phthalic anhydride.

By means of the process of the invention, pigments of shades between greenish-blue and reddish-blue are obtained according to the nature and crystallographic form of the initial crude phthalocyanine and according to the solvent employed.

More particularly, a pigment of β form is obtained when one starts from crude phthalocyanine taken directly from the synthesis, and a pigment of reddish-blue shade (for example a mixture of 80% α form and 20% ε form), is obtained when one starts from crude phthalocyanine of α form which may be obtained by the acid methods.

The stabilising compound selected may be for example one of the compounds defined in U.S. Pat. Nos. 3,764,361, 3,754,955 or 3,767,442 already mentioned. U.S. Pat. No. 3,764,361 discloses phthalocyanines of the general formula:

Pc[CH$_2$—X—A]n   (I)

in which Pc represents the residue of a phthalocyanine, X represents an oxygen or sulphur atom, A represents an aryl (preferably phenyl) radical which is unsubstituted or substituted by at least one alkyl group having up to 6 carbon atoms and n represents a whole number from 1 to 8, preferably 3 or 4.

The phthalocyanine of residue Pc may or may not be metallised. The phthalocyanine of residue Pc may be copper phthalocyanine in its α or β form or a halogenated derivative thereof, especially a chlorinated derivate containing up to 4% of chlorine.

The alkyl groups possibly substituting the aryl residue A preferably contain 1 to 4 carbon atoms.

U.S. Pat. No. 3,754,955 discloses phthalocyanine compounds of the general formula:

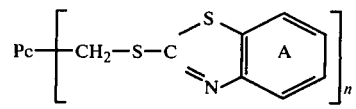

in which Pc represents a phthalocyanine residue, the benzene nucleus A is unsubstituted or substituted by at least one alkyl group having up to 4 carbon atoms and n represents a whole number from 1 to 8, preferably 3 or 4.

The phthalocyanine of residue Pc may or may not be metallised. The phthalocyanine of the residue Pc may be copper phthalocyanine in its α or β form or a halogenated derivative thereof, especially a chlorinated derivative containing up to 4 percent of chlorine.

U.S. Pat. No. 3,767,442 discloses phthalocyanine compounds of the general formula:

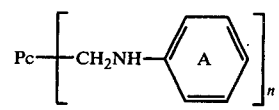

in which Pc represents a phthalocyanine residue, the benzene nucleus A is substituted by at least one alkyl group having up to four carbon atoms and n is a whole number from 1 to 4.

The phthalocyanine of residue Pc may or may not be metallised. The phthalocyanine of the residue Pc may be copper phthalocyanine in its α or β form or halogenated phthalocyanine derivative especially a chlorinated derivative containing up to 4 percent of chlorine.

The preferred stabilising compounds are tris-(phenoxymethyl) copper phthalocyanine, tris-(2,3-dimethylphenoxymethyl) copper phthalocyanine, tris-(2,3,5,-trimethylphenoxymethyl) copper phthalocyanine, tris-(phenylthiomethyl) copper phthalocyanine, tris-(benzothiazolyl-tris-methyl) copper phthalocyanine, tris-(4-methyl-phenylaminomethyl) copper phthalocyanine and tris-(2,4,6-trimethyl-phenylaminomethyl) copper phthalocyanine. The specific nature of the stabilising compound is not narrowly critical.

The stabilising compound may be introduced during, or preferably after, the dry grinding.

The concentration of stabilising compound is preferably from 2% to 20% of the weight of the phthalocyanine to be stabilised.

The temperature of the treatment with the crystallising solvent is from ordinary room temperature to the boiling temperature of the solvent. It is most often at least equal to 80° C.

The period of treatment varies generally between some minutes — 15 minutes for example — and ten hours and more especially between half an hour and four hours.

The dry grinding of the process of the invention enables a phthalocyanine to be obtained which has the particle dimensions required for pigmentary applications, but not necessarily having a pigmentary character, which depends not only on the particle dimensions, but also on the crystallinity, the form and the degree of aggregation of the particles.

The time when the dry grinding is interrupted may be determined by tests which enable the colouring power obtained according to the process of the invention to be verified in a well defined type of application, for example in emulsion paint.

The X-ray diffraction spectra of ground samples also enables the evolution of the properties of the product under the grinding effect to be followed. The two methods may advantageously be associated.

But, although according to the prior art, this grinding would generally be carried out until characteristic pigmentary properties are obtained, it is favorable according to the process of the invention to interrupt the grinding as soon as a feeble pigmentary character appears. The period of grinding can thus be appreciably reduced.

However, according to the invention the dry grinding of the crude phthalocyanine is effected without the mineral substrate; i.e., salt.

Grinding without mineral substrate has the advantage of increasing very greatly the production of capacity of the grinding installation, in addition to the fact that the operation of removing the substrate is avoided. This grinding may last for example, from 50 to 70 hours. A phthalocyanine of non-pigmentary (or feebly pigmentary) character is obtained at the end of this grinding.

According to the new process, the color strength is not developed (brought about) by the grinding operation, but is only developed after grinding by the treatment with the crystallizing solvent in the presence of the stabilizer.

As solvents are known to degrade the pigmentary character of the phthalocyanine, it could not then be foreseen that according to the process of the invention a non-pigmentary or feebly pigmentary phthalocyanine, in the presence of a solvent, acquires precisely this pigmentary character.

This surprising result is obtained by using simultaneously the phthalocyanine to be treated, crystallising solvent and stabilising compound. If in this mixture the crystallising solvent or the stabilising compound had been omitted, the final product would have been unusable.

The constancy in time of the properties of the pigment obtained according to the invention, both in colouring power and in shade and for the rheological properties obtained in use, is of great importance from the practical point of view.

The invention also enables an improved speed of dispersion in organic media and a greater colouring power to be conferred on the pigmentary phthalocyanines, whether of reddish blue shade or of $\beta$ form.

The invention includes the pigmentary compositions obtained by the novel process as well as the use of these compositions in the colouration for example of paints, inks, lacquers, plastic materials, artificial or synthetic fibres or in textile printing.

Throughout this specification all parts are to be understood as parts by weight.

The invention is illustrated by the following Examples.

EXAMPLE 1

In a bar mill, 96 parts of phthalocyanine of $\alpha$ form (obtained by crystallisation from sulphuric acid), are dry ground for 60 hours and without mineral substrate. The phthalocyanine thus obtained is not pigmentary.

4 parts of stabiliser obtained according to Example 2 of U.S. Pat. No. 3,764,361 which is the compound tris-(2,3,5-trimethylphenoxymethyl)-copper phthalcyanine, then 96 parts of the ground phthalocyanine previously obtained are introduced into 1000 parts of pyridine. The mixture is taken to 80° C. and maintained at this temperature for 1 hour while stirring. The mixture is diluted with 1000 parts of water at 60° C., and the product is filtered, washed with water to eliminate the pyridine and dried. The pyridine may also be steam distilled. A phthalocyanine pigment is obtained containing about 80% of $\alpha$ form and 20% of $\epsilon$ form of a beautiful reddish-blue shade, with excellent yield and stable to crystallisation. This product is suitable for all pigmentary applications.

Figure 3:
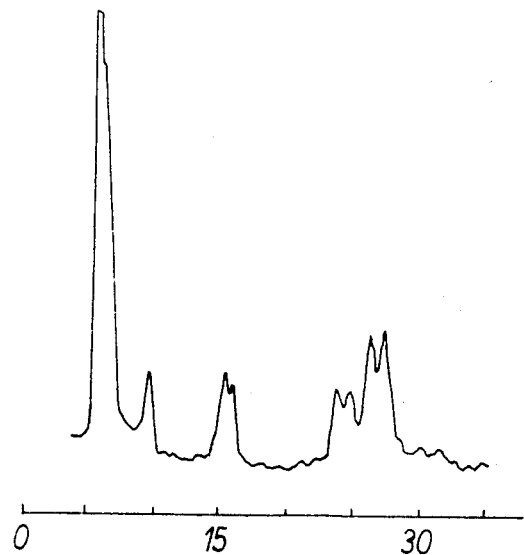
Figure 4:
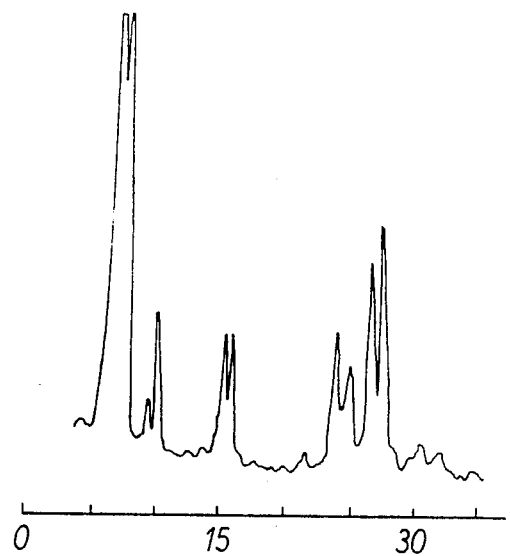

FIGS. 3 and 4 of the accompanying drawings relate to the mixture of pigmentary copper phthalocyanine of $\alpha$ form and of 3% of the stabilising compound according to Example 2 of U.S. Pat. No. 3,764,361. These Figures relate respectively to the X-ray powder diagram of this mixture before and after immersion for 2 hours in boiling xylene.

Figure 5:
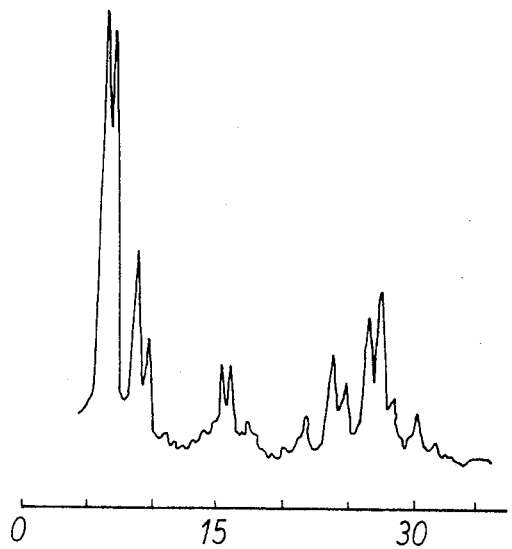
Figure 6:
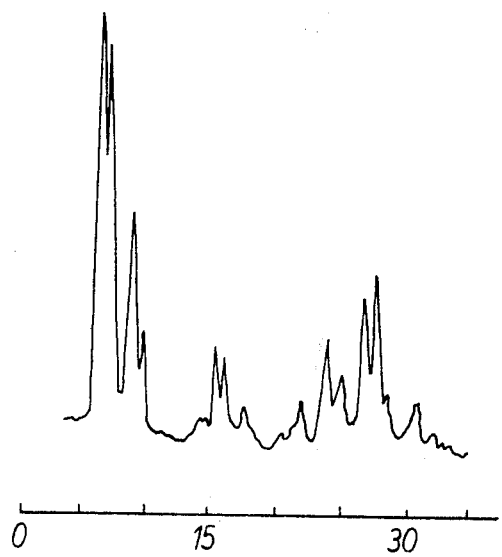

FIGS. 5 and 6 of the accompanying drawings represent respectively the X-ray powder diagram of the pigment according to the present Example, before and after immersion for 2 hours in boiling xylene.

The comparison between FIGS. 3 and 4 show that the pigment obtained according to the prior patent gives proof of a good stability in the solvents, and the crystallographic form is maintained. On the other hand, a considerable variation of the crystallinity appears.

According to FIGS. 5 and 6, the pigment according to the invention reveals an improved stability to solvents with respect to that of the aforesaid prior patent. Not only is the crystallographic form preserved, but in addition the crystallinity remains practically unchanged.

The variations in the colouring power and shade caused by the treatment in boiling xylene are as follows:

If an unstabilised pigmentary phthalocyanine of $\alpha$ form is subjected to this treatment for two minutes, a diminution of colouring power of 200% is found and a greener product is obtained.

If a mixture of unstabilised pigmentary phthalocyanine of $\alpha$ form and stabilising compound according to Example 2 of U.S. Pat. No. 3,764,361 is subjected to this treatment for 2 hours an increase of 10% in the colouring power is found, and the product becomes more reddish.

If this same treatment is carried out for 2 hours with the pigment obtained according to the present Example, it is found that the colouring power as well as the shade remain perfectly unaltered. These comparisons of colouring power and shade have been carried out on vinyl emulsion paint.

Variations of the same order are found after prolonged storage of the pigment in a solvent medium in an ink or a paint, at ordinary room temperature, this storage being able, according to the applications, to continue for periods of, for example, from some weeks to some months.

The speed of dispersion of the pigments in the form of powder is improved, with respect to that of the corresponding industrial pigment according to the prior technique, in applications relating to the colouration of plastic materials, inks, or paints. The corresponding industrial pigment is that which is used as the type of product in the application considered.

The colouring power in nitrocellulose ink is greater by 20% than that of the corresponding industrial pigment obtained according to the prior technique, and the colouring power in paint is greater by 10%.

EXAMPLE 2

4 parts of stabiliser obtained according to Example No. 2 of U.S. Pat. No. 3,764,361 are introduced into 400 parts of toluene, then 96 parts of non-pigmentary ground phthalocyanine obtained according to Example 1 of the present application are introduced. The mixture is taken to 100° C. and maintained at this temperature for 1 hour while stirring. After filtration, a toluene paste is obtained of phthalocyanine pigment of a reddish-blue shade (comprising about 60% of the α form and 40% of the ε form), of high yield and stable to crystallisation. This product is suitable for use in printing inks and in solvent paints.

The speed of dispersion of the pigment obtained according to the present Example in the form of paste is distinctly superior to that of the corresponding known industrial pigment.

EXAMPLE 3

4 parts of stabiliser obtained according to Example 2 of U.S. Pat. No. 3,764,361 then 96 parts of non-pigmentary ground phthalocyanine obtained according to Example 1 of the present application, are introduced into 300 parts of trichloroethylene. The mixture is taken to the boil and maintained for 2 hours at boiling temperature while stirring. 600 parts of white spirit (containing less than 5% of aromatics) are introduced. The trichloroethylene is distilled off and, after filtration, a paste of phthalocyanine pigment of reddish-blue shade (comprising 80% of the α form and 20% of the ε form) in a white spirit medium is obtained, with a high yield and stable to crystallisation. This product is suitable for use in solvent paint.

The speed of dispersion of the pigment obtained according to the present Example in the form of a paste is distinctly superior to that of the corresponding prior industrial pigment.

EXAMPLE 4

96 parts of non-pigmentary copper phthalocyanine of ε form are ground dry in a bar mill for 60 hours and without a mineral substrate. A ground non-pigmentary phthalocyanine of α form is thus obtained.

4 parts of stabiliser obtained according to Example 2 of U.S. Pat. No. 3,764,361 then 96 parts of the previously obtained ground phthalocyanine, are introduced into 500 parts of pyridine. The mixture is taken to 100° C. and maintained at this temperature for 2 hours while stirring. The pyridine is then eliminated by steam distillation and the product is dried. A phthalocyanine pigment of α form stable to crystallisation is obtained.

EXAMPLE 5

96 parts of crude phthalocyanine of α form (obtained by the acid method) are dry ground in a bar mill for 15 hours in the presence of 300 parts of mineral substrate (NaCl). The ground phthalocyanine thus obtained, after removal of the mineral substrate, has only a weak pigmentary yield. But after treatment with 1000 parts of pyridine in the presence of 4 parts of stabiliser obtained according to Example 2 of U.S. Pat. No. 3,764,361 at 80° C. for 1 hour while stirring and after diluting with water and washing in order to remove the pyridine and the mineral substrate, a pigment of reddish-blue shade with a very good pigmentary yield and stable to crystallisation is obtained.

According to a modification, the mineral substrate of the "ground phthalocyanine plus mineral substrate" mixture is eliminated in a first stage, then the ground phthalocyanine, free from mineral substrate, is treated in the form of an aqueous paste or a powder with the same amounts of pyridine and stabiliser. This pigment is suitable for any pigmentary application.

EXAMPLE 6

Crude copper phthalocyanine of β form is dry ground in a ball mill for 56 hours without mineral substrate. The ground phthalocyanine thus obtained has a mixed crystallographic form (75% α + 25% β) and has no pigmentary power.

4 parts of stabilizer obtained according to Example 2 of U.S. Pat. No. 3,764,361 then 96 parts of the ground phthalocyanine previously obtained are introduced into 1000 parts of pyridine. The mixture is taken to 80° C. and maintained at this temperature for 1 hour while stirring. The mixture is diluted with 1000 parts of hot water at 60° C. and the product is filtered, washed with water to remove the pyridine and dried.

The pyridine may also be steam distilled. A pigment of phthalocyanine entirely of the β form (greenish-blue shade) is obtained with high yield and stable to crystallisation. This product is suitable for any pigmentary application.

Figure 7:
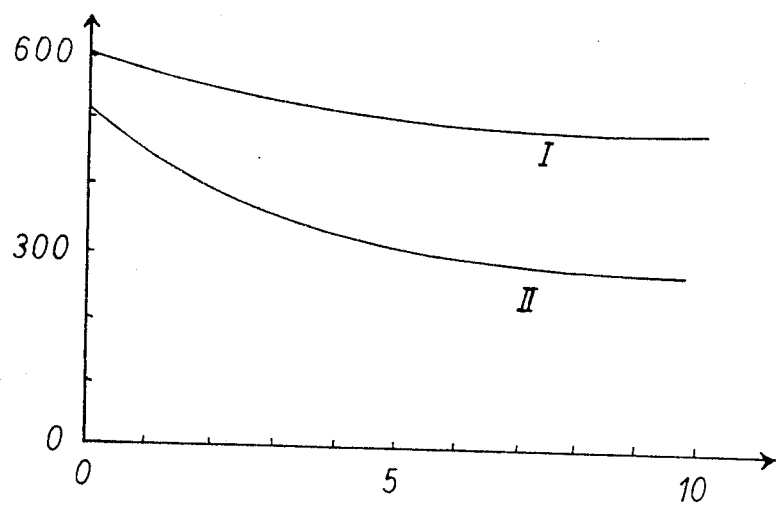

FIG. 7 of the accompanying drawings shows the variations in viscosity of two inks I and II in the course of tests of accelerated ageing (storage at 50° C.). In this Figure, the abscissae express the period of storage in days, and the ordinates the viscosity in centipoises.

The non-pigmentary part of the two inks has the following composition:
  nitrocellulose: 15%
  ethanol: 26%
  ethyl acetate: 26%
  methylethylketone: 26%
  dibutyl phthalate: 7%

Ink I is an ink containing 10% of copper phthalocyanine pigment of β form obtained according to the present Example. The grinding was effected for 45 minutes in a ball mill.

Ink II is an ink containing 10% of industrial copper phthalocyanine of β form (this pigment comprises 6% of a derivative obtained according to Example 2 of U.S. Pat. No. 3,764,361) and the grinding was effected for 45 minutes in a ball mill.

The measurements were effected in a Brookfield viscosimeter at 100 r.p.m. (with spindle No. 3) at 20° C.

Among the rheological properties, the viscosity is one of the most important in the case of the inks. A type of ink having a certain viscosity corresponds to each printing technique and it is important that the rheological properties of an ink, and in particuar the viscosity, should vary as little as possible during its storage. From this point of view, Ink I shows a stability distinctly superior to that of ink II.

The speed of dispersion of the pigment of the present Example in the form of powder is improved, with respect to that of the corresponding prior industrial pigment, in the applications with a view to the colouration of plastic materials, inks or paints.

The colouring power of the pigment obtained according to the present Example in nitrocellulose ink is 10% better than that of the corresponding prior industrial pigment.

EXAMPLE 7

4 parts of stabiliser obtained according to Example 2 of U.S. Pat. No. 3,764,361, then 96 parts of ground phthalocyanine of mixed form (75% α + 25% β) obtained according to Example 6 of the present application, are introduced into 400 parts of toluene. The mixture is taken to 100° C. and maintained at this temperature for 1 hour while stirring. After filtration, a toluene paste of phthalocyanine pigment is obtained which does not contain more than 5% of α form, of high yield and stable to crystallisation. This paste is suitable in printing inks and in solvent paints.

The speed of dispersion of the pigment obtained according to the present Example in the form of paste is distinctly superior to that of the corresponding prior industrial pigment.

EXAMPLE 8

4 parts of stabiliser obtained according to Example 2 of U.S. Pat. No. 3,764,361, then 96 parts of ground phthalocyanine of mixed form (75% α + 25% β) obtained according to Example 6 of the present application are introduced into 300 parts of trichloroethylene. The mixture is taken to the boil and maintained for 2 hours at boiling temperature while stirring. 600 parts of white spirit (containing less than 5% of aromatics) are introduced. The trichloroethylene is distilled off and, after filtration, a paste of phthalocyanine pigment of β form is obtained which does not contain more than 15% of α form in a white spirit medium, is of high yield and stable to crystallisation. This paste is suitable for solvent paints.

The speed of dispersion of the pigment obtained according to the present Example in the form of paste is distinctly superior to that of the corresponding prior industrial pigment.

We claim:

1. Improved process for the preparation of copper phthalocyanine pigment stable to crystallization by grinding a crude copper phthalocyanine and adding a compound stabilizing the pigment against crystallization and derived from phthalocyanine, wherein the improvement comprises in a first step dry grinding the crude phthalocyanine in the absence of any mineral substrate and of any crystallizing solvent thereby obtaining a ground phthalocyanine of non-pigmentary or feebly pigmentary character, and in a second step treating the said ground phthalocyanine with a crystallizing solvent in the presence of the stabilizing compound at a temperature from ordinary room temperature to the boiling temperature of the solvent, the concentration of the stabilizing compound being from 1% to 25% of the weight of the phthalocyanine.

2. Process according to claim 1 wherein the stabilising compound is added after the dry grinding.

3. Process according to claim 1 in which the stabilising compound has the formula:

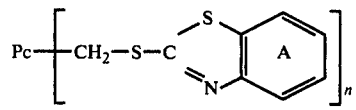

wherein Pc is a phthalocyanine residue, the benzene nucleus A is unsubstituted or substituted by at least one alkyl group having up to four carbon atoms and n represents a whole number from 1 to 8.

4. Process according to claim 3 in which the stabilising compound is tris-(benzothiazolyl-thio-methyl) copper phthalocyanine.

5. Process according to claim 1 in which the stabilising compound has the formula:

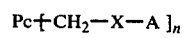

wherein Pc represents a phthalocyanine residue, X represents an oxygen or sulphur atom, A represents an aryl radical which is unsubstituted or substituted by at least one alkyl group having up to six carbon atoms and n represents a whole number from 1 to 8.

6. Process according to claim 5 in which the stabilising compound is tris-(phenoxymethyl) copper phthalocyanine, tris-(2,3-dimethylphenoxymethyl) copper phthalocyanine, tris-(2,3,5-trimethylphenoxymethyl) copper phthalocyanine, or tris-(phenylthiomethyl) copper phthalocyanine.

7. Process according to claim 1 in which the stabilising compound has the formula:

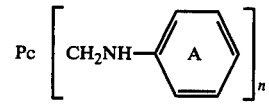

wherein Pc represents a phthalocyanine residue, the benzene nucleus A is substituted by at least one alkyl group having up to four carbon atoms and n is a whole number from 1 to 4.

8. Process according to claim 7 in which the stabilising compound is tris-(4-methyl-phenylaminomethyl) copper phthalocyanine or tris-(2,4,6-trimethyl-phenylaminomethyl) copper phthalocyanine.

9. Process according to claim 1 in which the crystallising solvent is: benzene, toluene, xylene, chlorobenzene, nitrobenzene, aniline, pyridine, dimethylformamide, dimethylsulphoxide, N-methylpyrrolidone, hexamethylphosphorotriamide, morpholine, trichloroethylene or butyl acetate, or any mixture thereof, an aqueous solution or emulsion of these solvents, or a mixture of one or more of these solvents with a non-crystallising solvent.

10. Process according to claim 1 in which the crude copper phthalocyanine is in one of the crystallographic forms α, β, γ or ε or a mixture of these forms.

11. Process according to claim 1 in which the concentration of ground phthalocyanine is from 5% to 50% of the weight of the crystallising solvent.

12. Process according to claim 1 in which the concentration is from 10% to 40%.

13. Process according to claim 1 in which at the end of the treatment with the crystallising solvent the latter is at least partially removed.

14. The improved process according to claim 1 wherein the stabilizing compound is introduced after the dry grinding has been performed.

* * * * *

UNITED STATES PATENT OFFICE
CERTIFICATE OF CORRECTION

PATENT NO. : 4,141,904
DATED : February 27, 1979
INVENTOR(S) : Louis A. CABUT et al.

It is certified that error appears in the above-identified patent and that said Letters Patent are hereby corrected as shown below:

On the title page in the line following

[30] Foreign Application Priority Data, the date of French application 74 10056 should read --March 25, 1974--.

Signed and Sealed this

Fourteenth Day of April 1981

[SEAL]

Attest:

RENE D. TEGTMEYER

Attesting Officer

Acting Commissioner of Patents and Trademarks